(12) United States Patent
Hoyer et al.

(10) Patent No.: US 6,339,924 B1
(45) Date of Patent: Jan. 22, 2002

(54) METHOD AND APPARATUS FOR ENCAPSULATING GAS TURBINE ENGINE FUEL CONNECTIONS

(75) Inventors: James Cottrell Hoyer, Cincinnati; Richard Walter Gronostaj, Fairfield, both of OH (US); Daniel Kelly Baldwin, Ryland Heights, KY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/588,074

(22) Filed: Jun. 6, 2000

Related U.S. Application Data (60) Provisional application No. 60/172,609, filed on Dec. 20, 1999.

(51) Int. Cl.⁷ .................................................. F02G 3/00
(52) U.S. Cl. ..................... 60/39.02; 60/39.094; 60/7.39
(58) Field of Search ........................... 60/39.02, 39.094, 60/739, 746

(56) References Cited

U.S. PATENT DOCUMENTS

| 5,259,185 A | 11/1993 | Peterson | .................. 60/39.094 |
| 5,263,314 A | 11/1993 | Anderson | ................ 60/39.094 |

*Primary Examiner*—Charles G. Freay
(74) *Attorney, Agent, or Firm*—Andrew C. Hess; Nathan D. Herkamp (57) ABSTRACT

A fuel manifold assembly for a gas turbine engine includes a spray shield that directs fuel that may leak from fuel line connections away from engine components. The spray shield attaches around the fuel line connections and includes a first portion and a second portion that is sized to be received within the first portion. The first portion includes at least two retention straps and the second portion includes at least one attachment projection and a pair of openings used to drain the fuel away from the engine. The second portion attaches to the first portion in only one orientation.

20 Claims, 5 Drawing Sheets

METHOD AND APPARATUS FOR ENCAPSULATING GAS TURBINE ENGINE FUEL CONNECTIONS

CROSS REFERENCE TO RELATED APPLICATION

This application claims the benefit of U.S. Provisional Application Ser. No. 60/172,609, filed Dec. 20, 1999.

BACKGROUND OF THE INVENTION

This invention relates generally to turbine engines, and, more particularly, to fuel connections within turbine engines.

A gas turbine engine typically includes a combustor that has a manifold assembly for supplying fuel to a combustion chamber. Fuel manifold assemblies include a plurality of circumferentially spaced fuel nozzles. Each fuel nozzle is coupled to a fuel tube that is connected to a fuel manifold ring. The fuel manifold ring is connected to a main fuel inlet tube by at least one fuel line connection.

During operation, the main fuel inlet tube is pressurized and supplies fuel to the fuel manifold ring. Over time, the fuel line connections may develop fuel leaks as a result of continued exposure to the increased pressure of the main fuel inlet tube. Such fuel leaks may impinge on hot engine components and auto-ignite causing potential damage to engine components.

To prevent fuel leaking from the fuel line connections and impinging on hot engine components, such connections typically include fuel line connection encapsulation devices. Known encapsulation devices include spray shields having a symmetric first portion sized to receive the fuel line connection. The first portion also includes a plurality of attachment projections and a drain opening for channeling fuel contained within the first portion away from the engine. The second portion is sized to receive the first portion and includes a plurality of openings that are sized to receive the attachment projections for securing the second portion to the first portion. Because the first portion is symmetric, the first portion may be secured to the second portion in several different orientations. As a result, the first portion may be installed such that the drain opening is oriented to permit fuel to drain from the first portion either towards the engine components or away from the engine components.

BRIEF SUMMARY OF THE INVENTION

In an exemplary embodiment, a gas turbine engine combustor includes a spray shield that attaches to the fuel manifold assembly such that potential fuel leaks that develop from fuel line connections are directed away from engine components. The fuel line connections attach a main fuel inlet tube to a fuel manifold ring and the spray shield encapsulates the fuel line connections to prevent any fuel leaking from the fuel line connections from impinging on engine components. Each spray shield includes a first portion and a second portion that is sized to be received within the first portion in only one orientation. The first portion includes at least two retention straps and the second portion includes at least one attachment projection and a pair of drain openings. The retention straps and the attachment projection permit the second portion to be secured to the first portion in only one orientation. The first portion also includes a fuel collar that extends from a sidewall circumscribing the first portion.

During engine operation, potential fuel leaks that occur at the fuel line connections are contained within the spray shield second portion. The fuel is gravity-drained from the spray shield through a pair of openings within the second portion and is directed towards the bottom of the engine and away from engine components. Furthermore, although the fuel is pressurized, the fuel collar prevents the fuel from inadvertently escaping the spray shield through a fuel line opening. Accordingly, a potential of autoignition or spontaneous combustion as a result of fuel impinging upon a hot engine component is reduced.

DETAILED DESCRIPTION OF THE INVENTION

Figure 1:
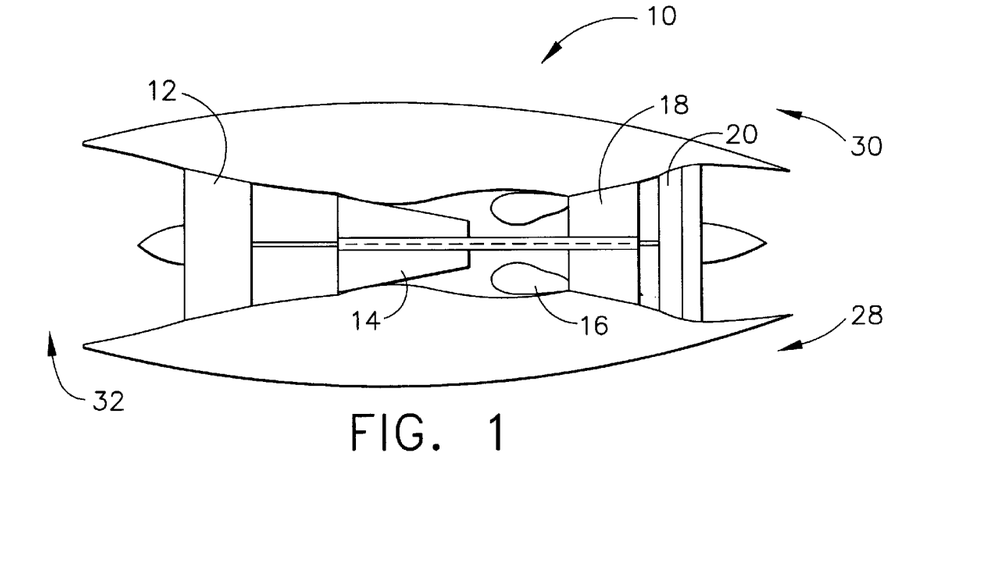
FIG. 1 is a schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. Engine 10 has a lower side 28 and an upper side 30. In one embodiment, engine 10 is a CF34-3A/-3B engine available from General Electric Company, Cincinnati, Ohio.

In operation, air flows through low pressure compressor 12 from an upstream side 32 of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Figure 2:
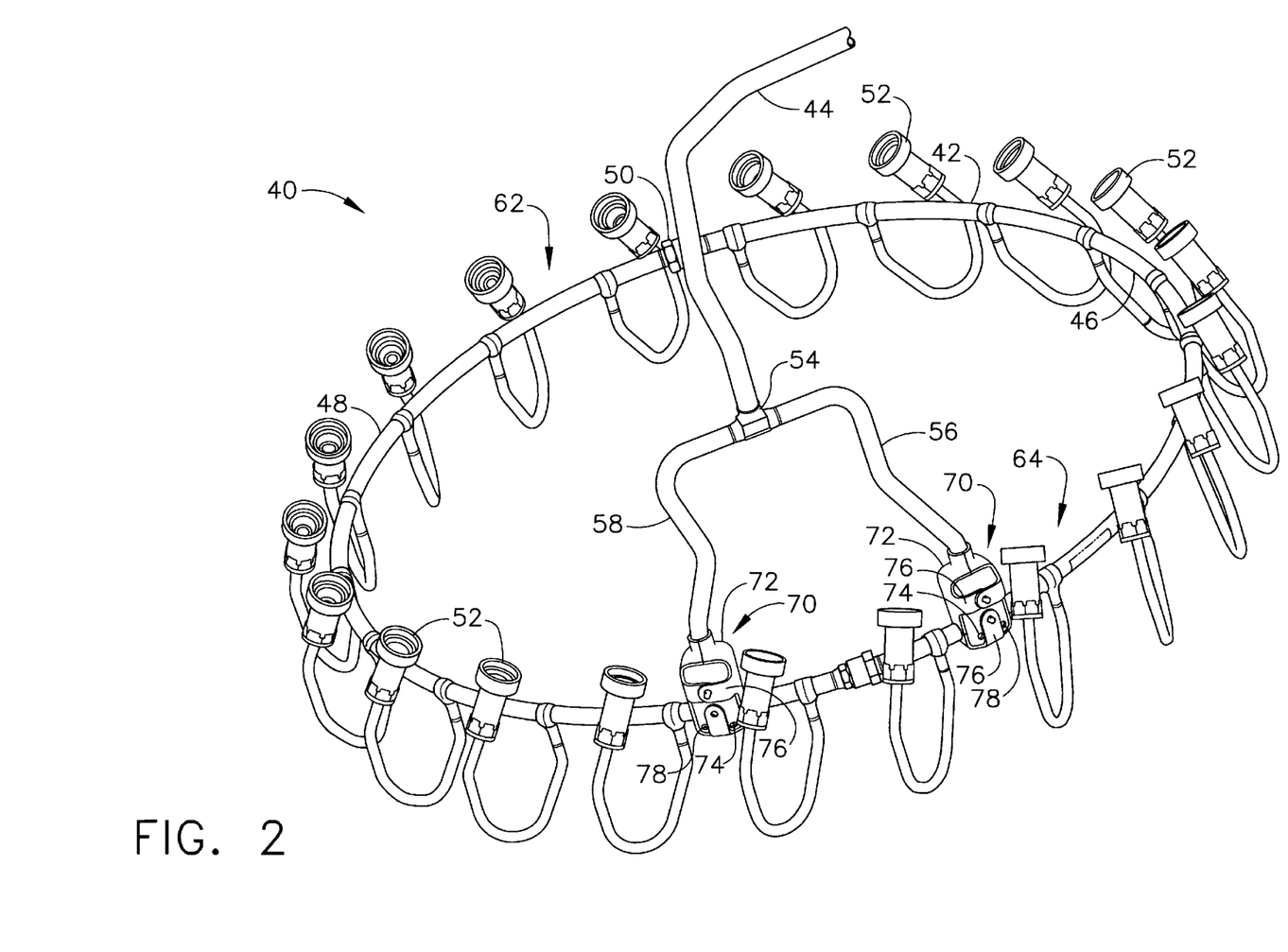
FIG. 2 is a perspective view of a fuel manifold assembly including a pair of installed spray shield assemblies that may be used with the gas turbine engine shown in FIG. 1.

FIG. 2 is a perspective view of a fuel manifold assembly 40 used to supply fuel to combustor assembly 16 (shown in FIG. 1). In one embodiment, combustor assembly 16 includes a plurality of fuel manifold assemblies 40. Fuel manifold assembly 40 includes a fuel manifold ring 42 and a main fuel inlet tube 44. Fuel manifold ring 42 extends circumferentially around shaft 26 (shown in FIG. 1) within engine 10 (shown in FIG. 1) and includes a first half 46 and a second half 48 coupled together by connectors 50. A plurality of shrouded drains 52 are spaced circumferentially around fuel manifold ring 42 and extend downstream from fuel manifold ring 42. A fuel nozzle (not shown) connects to each shrouded drain 52.

Main fuel inlet tube 44 includes a T-fitting 54 that divides fuel flow to supply fuel to manifold first half 46 and manifold second half 48 through a first auxiliary tube 56 and a second auxiliary tube 58, respectively. Each auxiliary tube 54 and 56 is attached to fuel manifold ring 42 with a fuel manifold junction (not shown). In one embodiment, each fuel manifold junction is a B-nut coupling connection.

Main fuel inlet tube 44 includes an upper side 62 and a lower side 64. Main fuel inlet tube 44 is attached to fuel manifold ring 42 such that the fuel manifold junctions are adjacent main fuel inlet tube lower side 64. Accordingly, because of the effects of gravity, any fuel remaining in fuel manifold ring 42 when engine 10 is not in operation, settles adjacent main fuel inlet tube lower side 28.

Each of the fuel manifold junctions are encapsulated with a spray shield assembly 70, described in more detail below. Spray shield assembly 70 includes a first portion 72 and a second portion 74. First portion 72 is sized to receive, in only one orientation, second portion 74. A plurality of retention straps 76 extend from first portion 72 and are used to attach second portion 74 to first portion 72 and secure spray shield assembly 70 around each fuel manifold junction 60. Second portion 74 includes a pair of openings 78 that permit fuel to drain from spray shield assembly 70.

During engine operation, engine components (shown in FIG. 1) increase in temperature. Because fuel supplied to fuel manifold assembly 40 is pressurized, over time, as a result of continued exposure to increased temperatures, pressures, and vibrations, fuel leaks may develop at the fuel manifold junctions. Spray shield assemblies 70 encapsulate each fuel manifold junction and prevent fuel that has leaked from the fuel manifold junction from impinging on engine components that are downstream from fuel manifold assembly 40. Because spray shield second portion 74 attaches within spray shield first portion 72 in only one orientation, openings 78 permit fuel that has leaked from the fuel manifold junction to gravity-drain towards engine lower side 28 and away from engine core components. Thus, a potential for autoignition or spontaneous combustion as a result of fuel impinging on a hot engine component is reduced.

Figure 3:
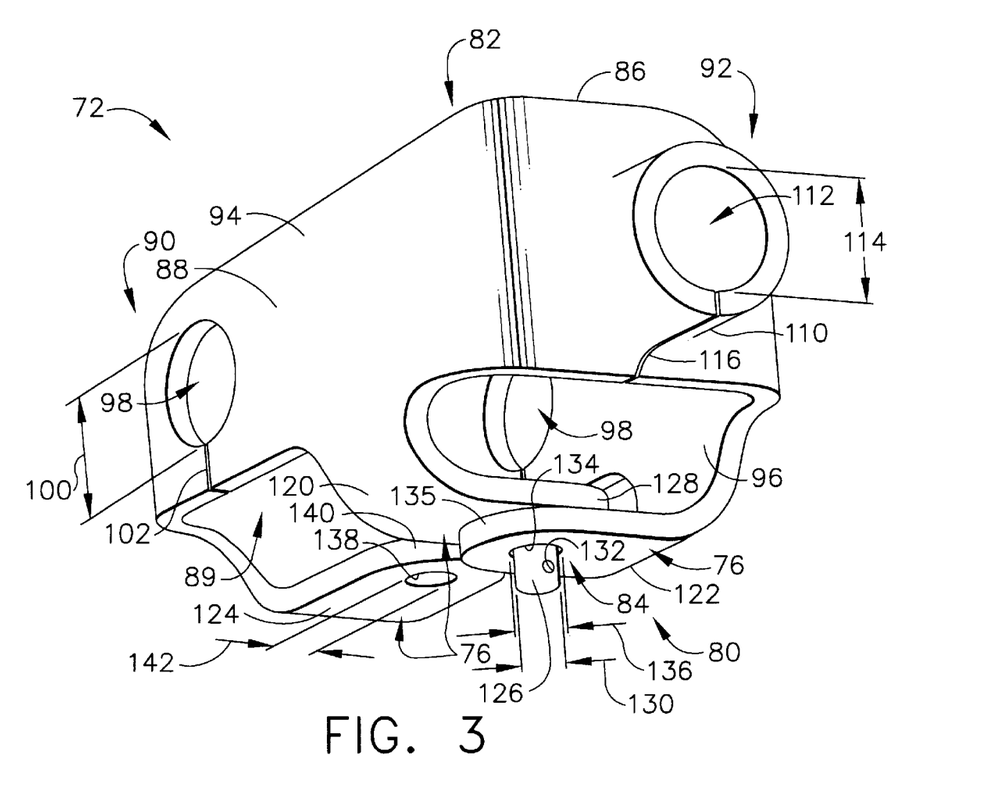
FIG. 3 is a perspective view of a spray shield first portion used with the spray shield assembly shown in FIG. 2.

FIG. 3 is a perspective view of spray shield assembly first portion 72. First portion 72 has a radially outer side 80 and a radially inner side 82 and includes an outer wall 84 and an inner wall 86 connected with a sidewall 88. Sidewall 88 circumscribes first portion 72 and cooperates with outer wall 84 and inner wall 86 to define a cavity 89. Cavity 89 is sized to receive, in only one orientation, spray shield assembly second portion 74 (shown in FIG. 2). First portion 72 is fabricated from a flexible or elastomer material. In one embodiment, first portion 72 is fabricated from a rubber material.

First portion inner wall 86 is substantially planar and has an oblong cross-sectional profile. When spray shield assembly 70 (shown in FIG. 2) is attached to fuel manifold assembly 40 (shown in FIG. 2), first portion inner wall 86 is radially inward from second portion outer wall 84 with respect to engine 10 (shown in FIG. 1).

Sidewall 88 is continuous and includes an upstream side 90, a downstream side 92, a first side 94, and a second side 96. Upstream side 90 is upstream from downstream side 92, and sidewall first and second sides 94 and 96, respectively, extend between downstream side 92 and upstream side 90. Sidewall first and second sides 94 and 96, respectively, each include an opening 98 that is substantially circular and has a diameter 100 sized to receive fuel manifold ring 42 (shown in FIG. 2). Additionally, sidewall first and second sides 94 and 96, respectively, also each include a slot 102 that extends between each opening 98 and spray shield assembly outer side 82 through sidewall first and second sides 94 and 96, respectively. Slots 102 permit sidewall first and second sides 94 and 96, respectively, to expand such that fuel manifold ring 42 may be slidably received in sidewall first and second side openings 98.

Sidewall upstream side 90 is substantially planar and sidewall downstream side 92 tapers to form a collar 110. Collar 110 includes an opening 112 that is substantially circular and has a diameter 114 sized to receive main fuel inlet tube 44 (shown in FIG. 2). Sidewall upstream side 90 also includes a slot 116 that extends through sidewall upstream side 90 between opening 112 and first portion outer side 80. Slot 116 permits sidewall upstream side 90 to expand such that main fuel inlet tube 44 may be inserted within sidewall upstream side 90 and received within sidewall opening 112.

First portion outer side 80 is formed from retention straps 76 that extend from sidewall 88. A first retention strap 120 extends from sidewall first side 94, a second retention strap 122 extends from sidewall second side 96, and a third retention strap 124 extends from sidewall upstream side 90. First retention strap 120 includes an anchor 126 that extends substantially perpendicularly from first retention strap 122 and is adjacent an end 128 of retention strap 120.

Anchor 126 has a diameter 130. An opening 132 extends through anchor 126 and is sized to receive a safety cable (not shown). Opening 132 is adjacent an end 133 of anchor 126. In one embodiment, anchor 126 is a capstan.

Second retention strap 122 includes an opening 134 adjacent an end 135 of second retention strap 122. Opening 134 has a diameter 136 slightly larger than anchor diameter 130. Specifically, second retention strap opening 134 is sized to receive anchor 126 in a frictional fit. Third retention strap 124 also includes an opening 138 adjacent an end 140 of third retention strap 124 and has a diameter 142.

Figure 4:
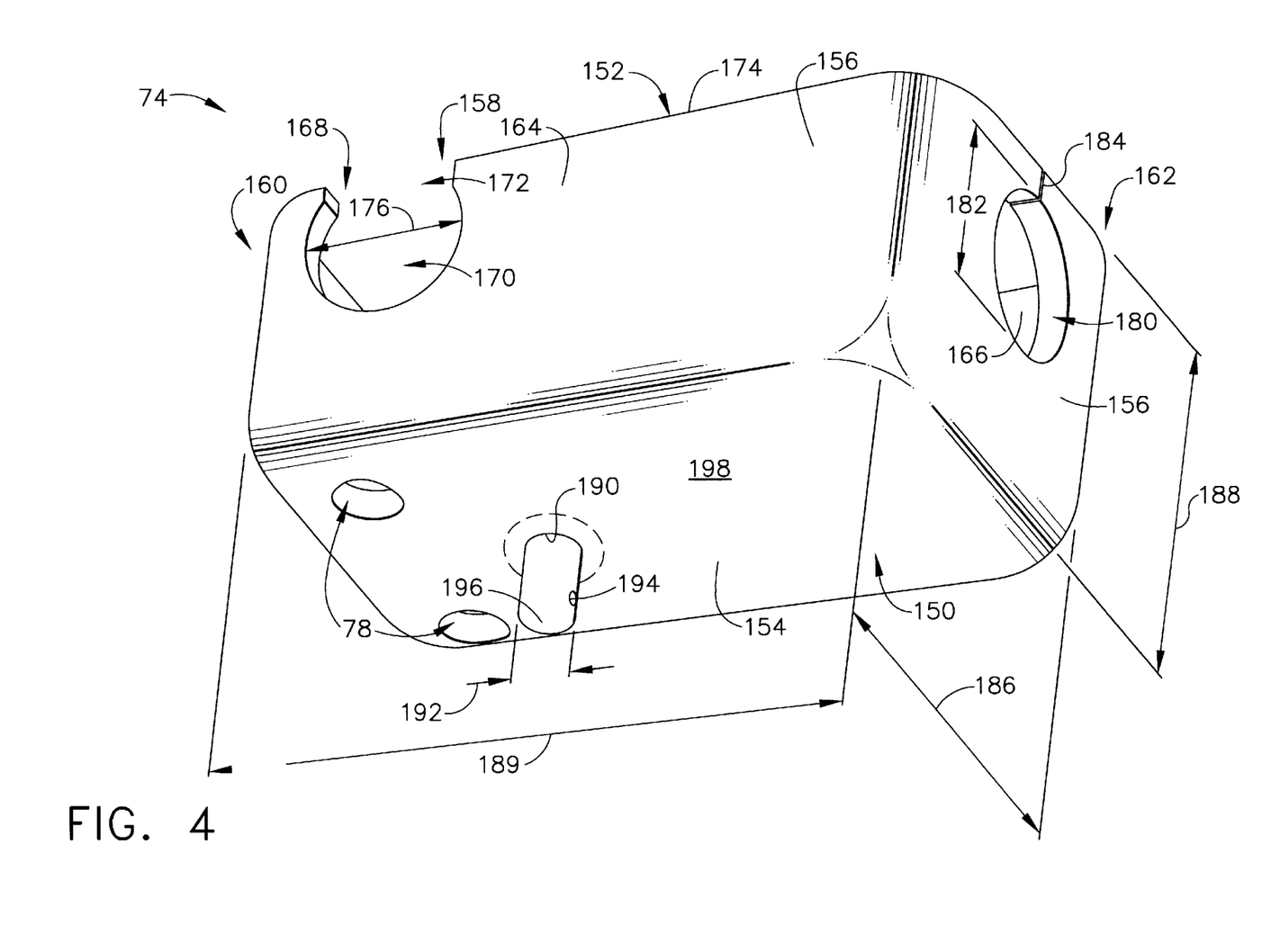
FIG. 4 is a perspective view of a spray shield second portion used with the spray shield assembly shown in FIG. 2.

FIG. 4 is a perspective view of spray shield assembly second portion 74 including openings 78. Second portion 74 has a radially outer side 150 and a radially inner side 152 and includes an outer wall 154 and a sidewall 156. Sidewall 156 extends from outer wall 154 and circumscribes outer wall 154. Outer wall 154 and sidewall 156 define a cavity 158 sized to receive a fuel manifold junction (not shown). Second portion 74 is fabricated from a flexible or elastomer material. In one embodiment, second portion 74 is fabricated from a rubber material.

Second portion outer wall 154 has an oblong cross-sectional profile. When spray shield assembly 70 (shown in FIG. 2) is attached to fuel manifold assembly 40 (shown in FIG. 2), second portion 74 is disposed such that second portion radially outer side 150 and outer wall 154 are radially outward from second portion radially inner side 152 with respect to engine 10 (shown in FIG. 1).

Sidewall 156 is continuous and includes an upstream side 160, a downstream side 162, a first side 164, and a second side 166. Upstream side 160 is upstream from downstream side 162, and sidewall first and second sides 164 and 166, respectively, extend between downstream side 162 and upstream side 160. Sidewall first and second sides 164 and 166, respectively, each have an opening 168 that includes a substantially circular portion 170 and a substantially rectangular portion 172 that extends from circular portion 170 to an edge 174 of sidewall 156 adjacent second portion radially inner side 152. Circular portion 170 has a diameter 176 approximately equal first portion opening diameter 100 (shown in FIG. 3). Diameter 176 permits circular portion 170 to receive fuel manifold ring 42 (shown in FIG. 2). Opening rectangular portion 172 permits fuel manifold ring 42 to be slidably received within sidewall first and second side opening circular portions 170.

Sidewall upstream side 160 is substantially planar and sidewall downstream side 162 includes an opening 180 that is substantially circular and has a diameter 182 that is approximately equal first portion opening diameter 112 (shown in FIG. 3). Diameter 182 is sized to receive main fuel inlet tube 44 (shown in FIG. 2). Sidewall downstream side 162 also includes a slot 184 that extends through sidewall downstream side 162 between opening 180 and second portion outer side 150. Slot 184 permits sidewall downstream side 162 to expand such that main fuel inlet tube 44 may be inserted within sidewall downstream side 162 and be received within sidewall opening 182.

Second portion 74 has a width 186 measured between sidewall first and second sides 164 and 166, respectively. Second portion 74 also has a height 188 measured between second portion outer and inner sides 150 and 152, and a length 189 measured between sidewall upstream and downstream sides 160 and 162, respectively. Second portion width 186 is less than a width (not shown) of first portion cavity 89 (shown in FIG. 3), second portion height 188 is less than height (not shown) of first portion cavity 89, and second portion length 189 is less than a length (not shown) of first portion cavity 89. Second portion 74 is sized to be received within first portion cavity 89.

An anchor 190 extends substantially perpendicularly from second portion outer wall 154 and ensures that second portion 74 is received in first portion cavity 89 in only one orientation. Furthermore, anchor 190 permits first portion 72 (shown in FIGS. 2 and 3) to be secured to second portion 74. In one embodiment, anchor 190 is identical to first portion anchor 126 (shown in FIG. 3). Anchor 190 includes a diameter 192 and has a cylindrical cross-sectional profile. Diameter 192 is slightly smaller than first portion third retention strap opening diameter 142 (shown in FIG. 3). An opening 194 extends diametrically through anchor 190 and is sized to receive a safety cable (not shown). Opening 194 is adjacent an end 196 of anchor 190. In one embodiment, anchor 190 is a capstan. Anchor 190 is downstream from openings 78 that extend from an outer surface 198 of second portion 74.

Figure 5:
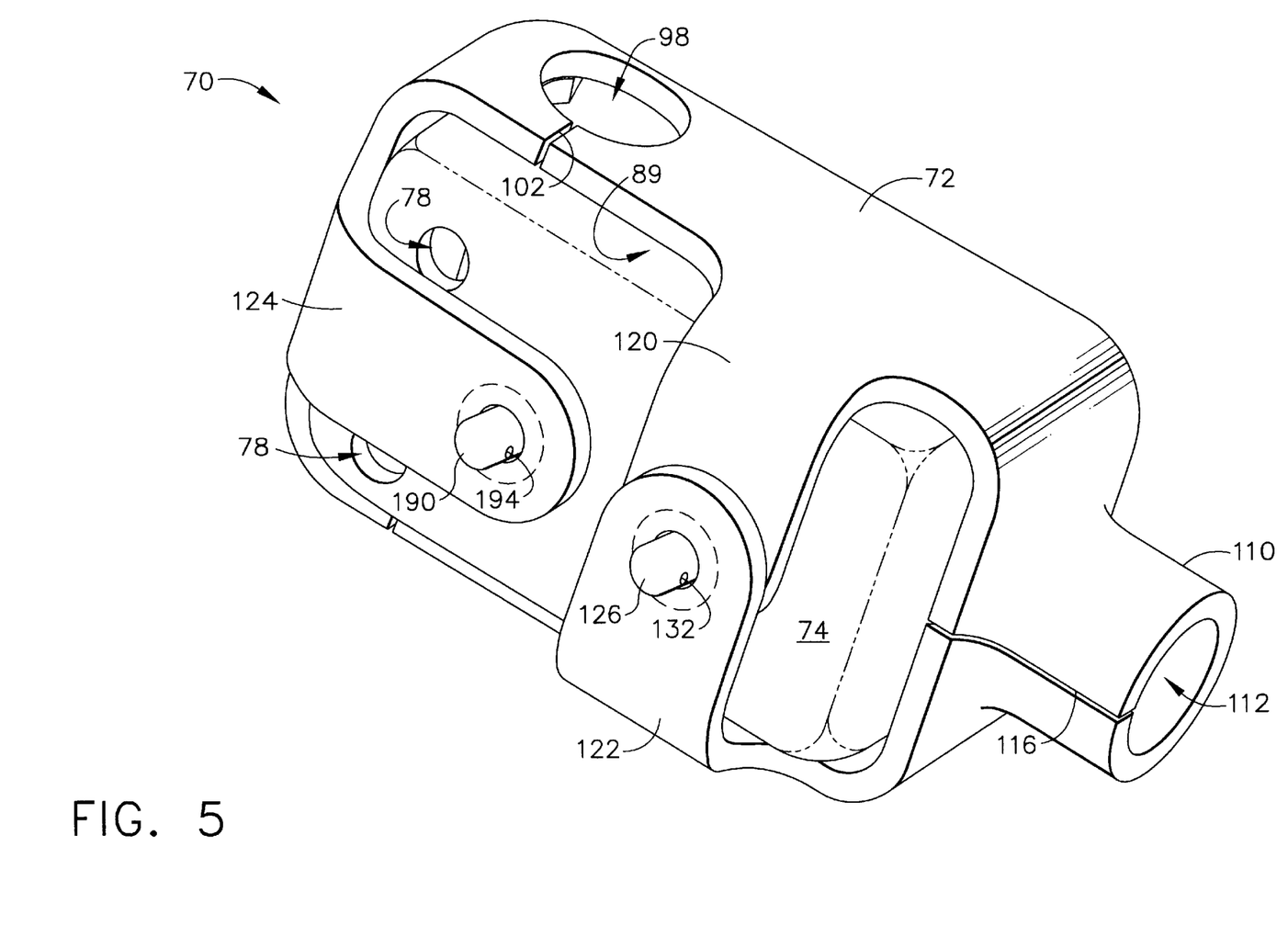
FIG. 5 is a perspective view of the spray shield assembly shown in FIG. 2 uninstalled to a fuel manifold assembly.

FIG. 5 is a perspective view of spray shield assembly 70 including second portion 74 installed within first portion 72. During installation of spray shield assembly 70 to a fuel manifold assembly 40 (shown in FIG. 2), initially second portion 74 is positioned around a downstream side of each fuel manifold junction (not shown). When second portion 74 is being installed, second portion openings 168 (shown in FIG. 4) are positioned such that opening rectangular portion 172 (shown in FIG. 4) is adjacent fuel manifold ring 42 (shown in FIG. 1), the fuel manifold junction is adjacent second portion cavity 158 (shown in FIG. 4), and second portion opening slot 184 (shown in FIG. 4) is adjacent main fuel inlet tube 44 (shown in FIG. 2). As second portion 74 is transitioned upstream and installed, fuel manifold ring 42 slides through rectangular portion 172 and is received in circular portion 170 (shown in FIG. 4) of second portion opening 168, main fuel inlet tube 44 slides through second opening slot 184 (shown in FIG. 4) and is received in second portion opening 180 (shown in FIG. 4), and the fuel manifold junction is received in second portion cavity 158.

When second portion 74 is aligned, second body portion openings 78 are positioned to permit fuel to flow towards engine lower side 28 and away from engine core components (shown in FIG. 1). First portion 72 is then attached to second portion 74. First portion 72 is initially positioned upstream from the fuel manifold junction such that first portion opening slots 102 are adjacent fuel manifold ring 42, second portion 74 is adjacent first portion cavity 89 and first portion collar slot 116 is adjacent main fuel inlet tube 44. As first portion 72 is moved downstream to be installed, fuel manifold ring 42 slides through first portion opening slots 102 and is received in openings 98, second portion 74 is received in first portion cavity 89, and main fuel inlet tube 44 slides through first portion collar slot 116 and is received in first portion collar opening 112. Furthermore, after first body portion 72 is attached, first portion openings 98 and collar 110 are aligned concentrically with second openings 168 and 180, respectively.

After second portion 74 is received within first portion cavity 72, first portion first retention strap 120 is wrapped around second portion 74. First portion retention strap 122 is then wrapped around second portion 74 and secured to retention strap 122 such that first portion anchor 126 is frictionally received within retention strap opening 134 (shown in FIG. 3). Third retention strap 124 is then extended between second portion openings 78 towards first portion collar 110 and secured to second portion 74 such that second portion anchor 190 is frictionally received within third retention strap opening 138. After first portion retention straps 120, 122, and 124 are attached, safety wire (not shown) is inserted within anchor openings 132 and 194 to secure second portion 74 within first portion 72 and to prevent retention straps 120, 122, and 124 from dislodging from respective anchors 126 and 190.

Because second portion 74 includes anchor 190, first portion 72 may only receive second portion 74 in one orientation in which second portion openings 78 are oriented to permit fuel that has leaked from the fuel manifold junction to gravity-drain towards engine lower side 28 (shown in FIG. 1) and away from the engine core components. Thus, a potential of autoignition or spontaneous combustion as a result of fuel impinging upon a hot engine component is reduced. Additionally, because fuel manifold ring 42 is received in close tolerance within first and second portion openings 168 and 98, fuel is prevented from leaking from spray shield assembly 70 through openings 168 and 98. Furthermore, because main fuel inlet tube 44 is received in close tolerance within first portion collar 110 and second portion opening 180, fuel is prevented from leaking from spray shield assembly 70 through second portion opening 180 and first portion collar 110.

Figure 6:
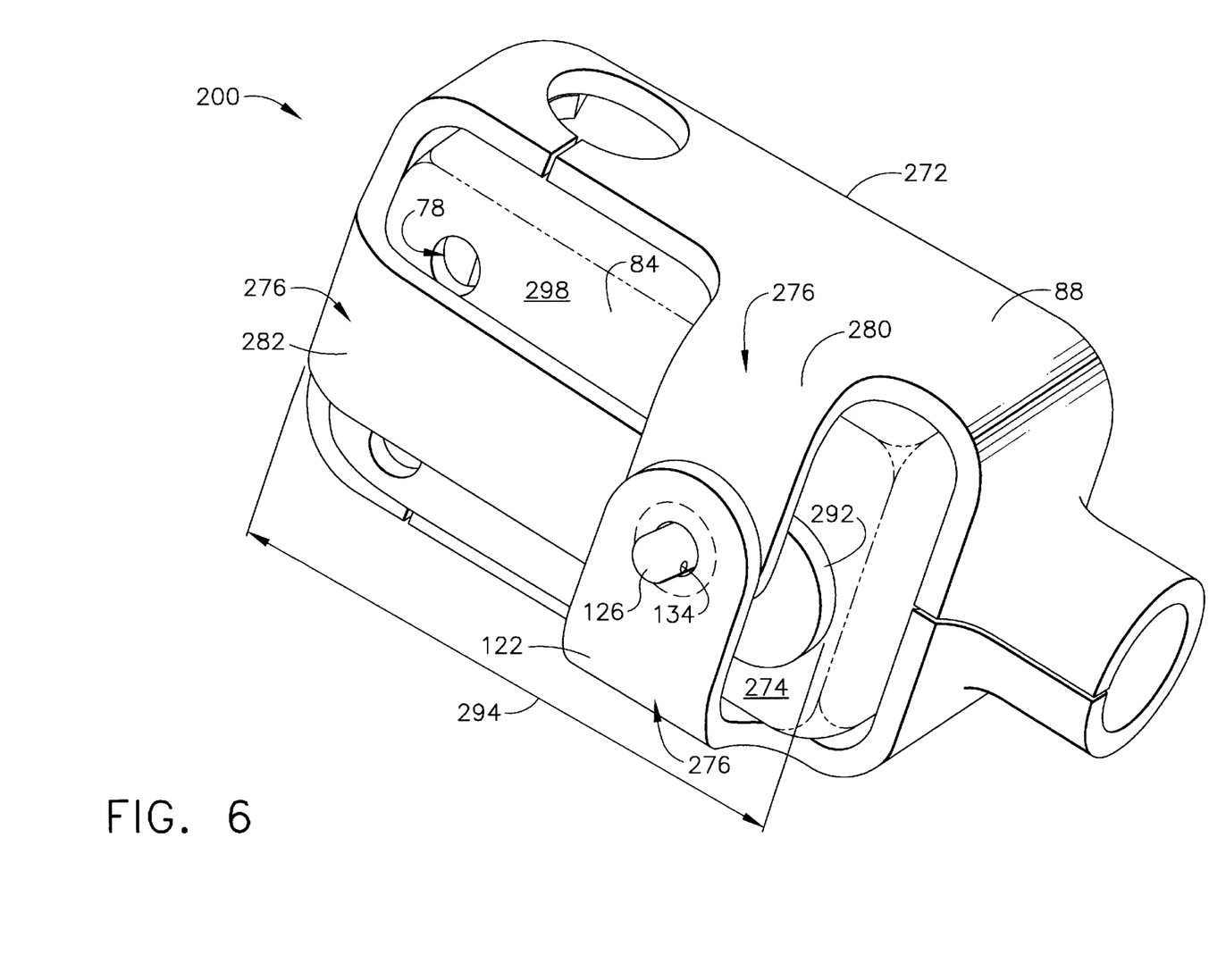
FIG. 6 is a perspective view of an alternative embodiment of a spray shield assembly that may be used with the gas turbine engine shown in FIG. 1.

FIG. 6 is a perspective view of an alternative embodiment of a spray shield assembly 200 that may be used with gas turbine engine 10 (shown in FIG. 1). Spray shield assembly 200 includes a first portion 272 and a second portion 274. First portion 272 is sized to receive second portion 274 in only one orientation. A plurality of retention straps 276 extend from first portion 272 and are used to attach second portion 274 to first portion 272 and secure spray shield assembly 200 around each fuel manifold junction (not shown). Second portion 274 includes openings 78 that permit fuel to gravity-drain from spray shield assembly 200 towards engine lower side 28 (shown in FIG. 1) and away from engine core components (shown in FIG. 1).

Spray assembly first portion 272 is substantially similar to spray assembly first portion 72 (shown in FIGS. 2, 3, and 5) and includes outer wall 84, inner wall 86 (shown in FIG. 3), side wall 88, and second retention strap 122. First portion 272 also includes a first retention strap 280 and a third retention strap 282. First retention strap 280 is identical to second retention strap 122 and includes an opening 134 disposed adjacent an end 284 of first retention strap 280. Third retention strap 282 includes anchor 126 disposed adjacent an end 292 of third retention strap 282 and has a length 294 extending between sidewall 88 and end 292 to permit anchor 126 to be received within first and second retention strap openings 134.

Spray assembly second portion 274 is substantially similar to spray assembly second portion 74 (shown in FIGS. 2, 4, and 5) and includes sidewall 156 (shown in FIG. 4) and an outer wall 298 that includes openings 78. Outer wall 298 is substantially planar and does not include an anchor, such as anchor 190 (shown in FIGS. 4 and 5).

During installation of spray shield assembly 270 to a fuel manifold assembly 40, initially second portion 274 is attached in a manner similar to that used in attaching second portion 74 and is positioned around a downstream side of each fuel manifold junction. Spray shield assembly first portion 272 is then attached to second portion 274 in a manner similar to that used in attaching first portion 72 to second portion 74.

After second portion 274 is received within first portion cavity 272, first portion 272 is secured to second portion 274. First portion third retention strap 282 is wrapped around second portion 274 and extended between second portion openings 78 towards first portion collar 110. First portion first and second retention straps 280 and 122, respectively, are then wrapped around second portion 272 and secured to third retention strap 282 such that third retention strap anchor 126 is frictionally received within first and second retention strap openings 134. After first portion retention straps 280, 122, and 282 are attached to anchor 126, safety wire (not shown) is inserted within anchor opening 132 to secure second portion 274 within first portion 272 and to prevent retention straps 280, 122, and 282 from dislodging from anchors 126.

The above-described fuel manifold spray shield is cost-effective and highly reliable. The two-piece spray shield assembles in only one orientation such that fuel gravity drains towards the bottom of the engine and away from engine components. As a result, the fuel does not impinge on hot engine components and a risk of autoignition or spontaneous combustion as a result of fuel impinging upon a hot engine component is reduced.

While the invention has been described in terms of various specific embodiments, those skilled in the art will recognize that the invention can be practiced with modification within the spirit and scope of the claims.

What is claimed is:

1. A method for encapsulating a fuel manifold assembly coupling in a gas turbine engine using a spray shield, the spray shield including a first portion and a second portion, the first portion sized to receive the second portion in only one orientation, said method comprising the steps of:

attaching the spray shield second portion around the coupling;

attaching the spray shield first portion around the coupling such that the second portion is received within the first portion and is attached to the first portion.

2. A method in accordance with claim 1 wherein the gas turbine engine includes an engine core, said step of attaching the spray shield first portion further comprising the step of securing the second portion to the first portion to prevent potential fuel leaks from the fuel manifold assembly coupling from impinging on the gas turbine engine core during engine operations.

3. A method in accordance with claim 1 wherein the spray shield first portion includes a sidewall including a plurality of openings, the spray shield second portion includes a sidewall including a plurality of openings, said step of attaching the spray shield first portion further comprising the step of attaching the first portion to the second portion such that the first portion openings are concentric with the second portion openings.

4. A method in accordance with claim 1 wherein the spray shield first portion includes an outer side, the spray shield second portion includes an outer side, at least one of the spray shield first and second portions includes an anchor, said step of attaching the spray shield first portion further comprises the step of securing the second portion within the first portion with the anchor.

5. A spray shield assembly for a gas turbine engine fuel manifold assembly, said spray shield assembly comprising:

a first portion comprising an outer side, an inner side, a sidewall, and at least one retention strap, said first portion outer and inner sides connected with said sidewall, said retention strap extending from said sidewall towards said first portion outer side; and a second portion comprising an outer side, an inner side, and a sidewall, said second portion outer and inner sides connected with a sidewall, said second portion configured to attach within said first portion in only one orientation.

6. A spray shield assembly in accordance with claim 5 wherein said second portion further comprises a plurality of first openings disposed within said second portion outer side and a plurality of second openings disposed within said second portion sidewall.

7. A spray shield assembly in accordance with claim 5 wherein said first portion further comprises a plurality of first openings disposed within said first portion sidewall.

8. A spray shield assembly in accordance with claim 5 wherein said first portion further comprises a plurality of openings disposed within said first portion sidewall, said second portion firther comprises a plurality of openings disposed within said second portion sidewall, said second portion configured to attach within said first portion such that said first openings are concentric with said second openings.

9. A spray shield assembly in accordance with claim 5 wherein at least one of said first portion and said second portion comprises an anchor configured to secure said second portion within said first portion.

10. A spray shield assembly in accordance with claim 9 wherein said anchor extends from at least one of said first portion outer side and said second portion outer side.

11. A spray shield assembly in accordance with claim 9 wherein said first portion retention strap comprises at least one opening sized to receive said anchor.

12. A spray shield assembly in accordance with claim 5 wherein said first portion comprises three retention straps, each of said three retention straps comprises an opening.

13. A fuel manifold assembly for a gas turbine engine, said fuel manifold assembly comprising:

a fuel manifold ring extending circumferentially within the gas turbine engine;

a main fuel inlet tube attached to said fuel manifold ring with at least one coupling, said main fuel inlet tube in flow communication with said fuel manifold ring;

at least one spray shield assembly encapsulating each at least one coupling, said spray shield comprising a first portion and a second portion, said first portion sized to receive said second portion, said second portion configured to attach within said first portion in only one orientation.

14. A fuel manifold in accordance with claim 13 wherein the gas turbine engine includes an engine core, said spray shield configured to prevent potential fuel leaks at said at least one coupling from impinging on the gas turbine engine core during engine operations.

15. A fuel manifold in accordance with claim 13 wherein said spray shield first portion comprises a sidewall comprising a plurality of openings, said spray shield second portion comprises a sidewall comprising a plurality of openings, said second portion configured to attach within said first portion such that said first portion openings are concentric with said second portion openings.

16. A fuel manifold in accordance with claim 13 wherein at least one of said spray shield first portion and said spray shield second portion comprises an anchor configured to secure said second portion within said first portion.

17. A fuel manifold in accordance with claim 16 wherein said spray shield first portion comprises an outer side and an inner side, said spray shield second portion comprises an outer side and an inner side, said spray shield anchor extends from at least one of said spray shield first portion outer side and said second portion outer side.

18. A fuel manifold in accordance with claim 13 wherein said spray shield second portion comprises an outer side, an inner side, and a plurality of openings disposed in said second portion inner side.

19. A fuel manifold in accordance with claim 18 wherein said second portion openings configured to permit fuel to drain from said spray shield.

20. A fuel manifold in accordance with claim 13 wherein said spray shield first portion comprises an outer side, an inner side, a sidewall and at least one retention strap, said first portion outer and inner sides connected with said sidewall, said retention strap extending from said sidewall towards said first portion outer side and comprising at least one opening, said spray shield second portion comprises an outer side, an inner side, and a sidewall extending between said second portion outer and inner sides.

* * * * *

UNITED STATES PATENT AND TRADEMARK OFFICE
CERTIFICATE OF CORRECTION

PATENT NO. : 6,339,924 B1
DATED : January 22, 2002
INVENTOR(S) : Hoyer et al.

It is certified that error appears in the above-identified patent and that said Letters Patent is hereby corrected as shown below:

Title page,
Item [*], Notice, delete the phrase "by 0 days" and insert -- by 37 days --

Signed and Sealed this

Twenty-first Day of September, 2004

JON W. DUDAS
*Director of the United States Patent and Trademark Office*